T. W. McMICKEN.
SAW FILER AND GUMMER.
APPLICATION FILED MAR. 1, 1915.
1,180,270.
Patented Apr. 18, 1916.
3 SHEETS—SHEET 3.
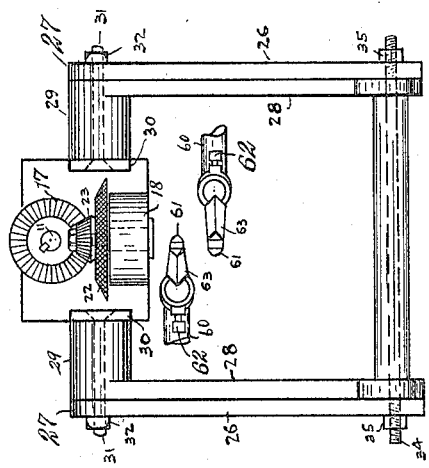
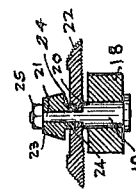
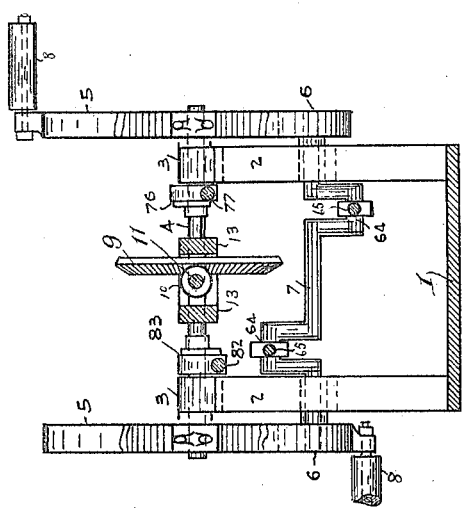
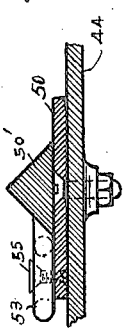
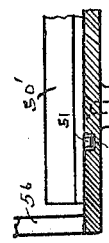
WITNESSES:
INVENTOR
Thomas W. McMicken
BY
Hardway & Cattery
ATTORNEYS

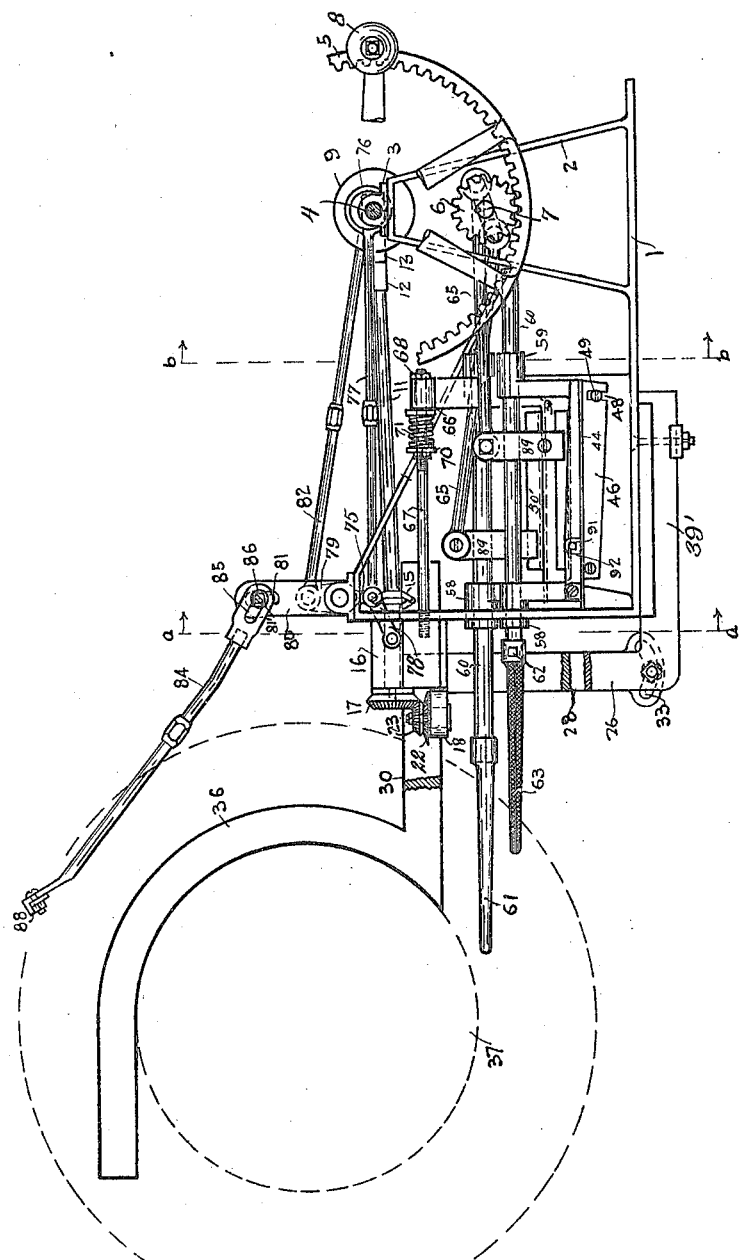

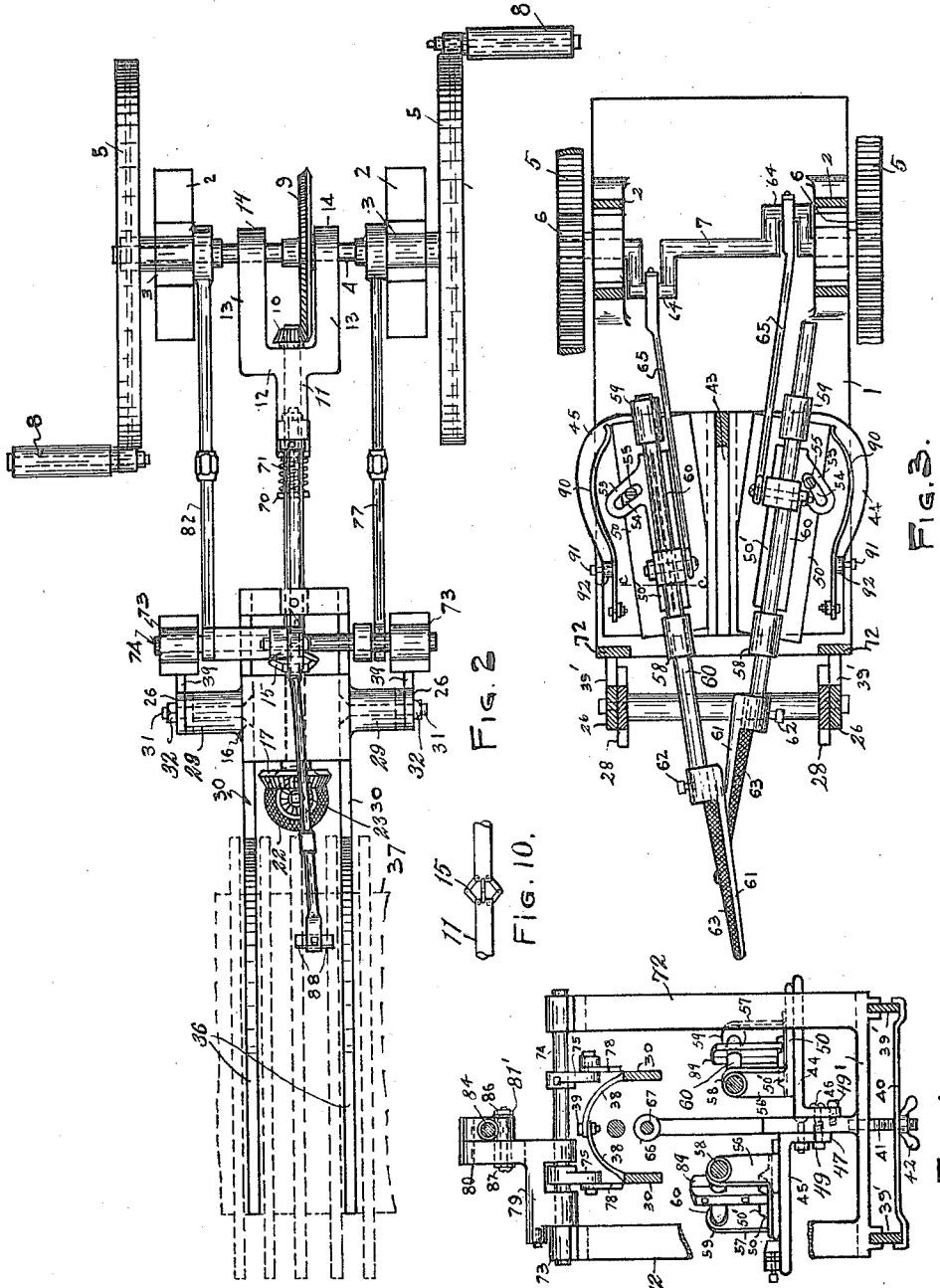

UNITED STATES PATENT OFFICE.

THOMAS W. McMICKEN, OF WHARTON, TEXAS.

SAW FILER AND GUMMER.

1,180,270.  Specification of Letters Patent.  Patented Apr. 18, 1916.

Application filed March 1, 1915. Serial No. 11,335.

*To all whom it may concern:*

Be it known that I, THOMAS W. MC-MICKEN, a citizen of the United States, residing at Wharton, in the county of Wharton and State of Texas, have invented certain new and useful Improvements in Saw Filers and Gummers, of which the following is a specification.

This invention relates to new and useful improvements in a saw filer and gummer.

The object of the invention is to provide a device of the character described adapted for the purpose of sharpening and gumming the teeth of circular saws, particularly such saws as are used in cotton gins, for the purpose of ginning cotton.

A further object of the invention resides in the provision of a device of this character, which will automatically impart partial rotations to the saw being sharpened, successively, so as to bring the teeth thereof into successive contact with the sharpening gummer and files.

A further feature resides in the provision of a construction which automatically withdraws the gummer and file from contact with the saw teeth, while the saw is being turned.

A still further feature resides in the provision of an adjustable support upon which the files are mounted, whereby they may be adjusted in proper relation to the saw teeth, said feature also embodying an adjusting mechanism for the gummer, for a like purpose.

With the above and other objects in view the invention has particular relation to certain novel features of construction, operation and arrangement of parts, an example of which is given in this specification and illustrated in the accompanying drawings, wherein:

Figure 1, shows a side elevation of the device, showing certain parts broken away for the sake of clearness. Fig. 2, shows a plan view of the top portion of the device. Fig. 3, shows a plan view of the body portion thereof, showing the file operative mechanism and the file supports. Fig. 4, shows a fragmentary sectional view, taken on the line *a—a*, of Fig. 1. Fig. 5, shows a vertical sectional view, taken on the line *b—b*, of Fig. 1. Fig. 6, shows a partial front elevation, the files and gummer, and the supporting mechanism of the latter, only, being shown. Fig. 7, shows an edge view of the gummer. Fig. 8, shows a transverse sectional view of the track on which the file support slides, taken on the line *c—c*, of Fig. 3. Fig. 9, shows a fragmentary side elevation thereof, and Fig. 10 shows a fragmentary view of the extensible drive shaft.

Referring now more particularly to the drawings wherein like numerals of reference designate similar parts in each of the figures, the numeral 1, refers to a supporting base, upstanding from the rear end of which are the legs 2, 2, preferably cast integral therewith, whose upper ends have the bearings 3, 3, in which the shaft 4, rotates. Fixed to opposite ends of this shaft, are the respective gear wheels, 5, 5, whose rims have internal spur gear faces, which mesh with corresponding spur gears 6, 6, fixed upon the respective ends of the crank shaft 7, and the gear wheels 5, have the grips 8, 8, carried thereby respectively, through which rotation may be imparted thereto.

The shaft 4, has a beveled pinion 9, fixed thereon, which is in mesh with a corresponding beveled pinion 10, which is fixed upon the rear end of the shaft 11. The rear end of this last mentioned shaft has a bearing in the front end of the yoke 12, whose rear end is bifurcated, forming the fingers 13, 13, which embrace the pinions 9 and 10, each finger having the alined bearings 14, 14, through which the shaft 4, extends, and by means of which the yoke is supported. The shaft 11, has a universal joint 15, permitting the lengthening and shortening of said shaft, and the forward end of the shaft extends through and has a bearing in, the slidable block 16, and fixed to the extreme front end of the shaft 11, is a beveled pinion 17. The forward end of the block 16, has a vertical bearing 18, through which the lower end of the short shaft 19, extends and slightly above the upper surface of this bearing the shaft 19 is abruptly offset, forming the annular shoulder 20, and the reduced neck 21.

The numeral 22 designates the gummer, which is disk-like in form having a flat under surface and a beveled upper surface, said under and upper surfaces being roughened, or serrated, as shown in Fig. 7. This gummer has a central orifice which receives the neck 21, which fits snugly therein and the gummer is supported upon the shoulder 20 and thereby held out of contact with the upper surface of bearing 18. A beveled pinion 23, is provided having a central orifice, which also receives the neck 21, snugly, and the lower side of this pinion has the downwardly projecting studs, 24, 24, which fit into corresponding recesses in the gummer 22, and prevent the rotation of the pinion 23, relative to the gummer. The gummer 22 and the pinion 23, are locked in position on the neck 21, by means of the lock nut 25, which is screwed on to the upper end of the neck 21, and the pinion 23 is in mesh with and receives rotation from the pinion 17.

At the front end of the base 1, and upstanding from the respective sides thereof, are the respective standards 26, 26, whose upper ends have the corresponding bearings 27, 27, in alinement. The numerals 28, 28, designate swinging arms, whose upper ends, respectively, have the inwardly extending bearings 29, 29, in alinement with the corresponding bearings 27, 27, and secured against the inner ends of these corresponding bearings 29, 29, are the forwardly extending tracks 30, 30, which are seated in and conform in shape to side grooves in the block 16, and passing through the track 30, and the alined bearings 29 and 27, on each side are the bolts 31, 31, whose inner ends have heads which are counter sunk, in the respective tracks 30, 30, and whose outer ends are threaded and receive the respective nuts 32, 32. The lower ends of the respective arms 28, 28, have transverse arcuate slots, as 33, and a rod 34, passes through orifices in the lower ends of the standards 26, and also through said arcuate slots and the ends of this rod are threaded to receive the nuts 35, 35, and by means of which the arms 28, 28, can be locked in fixed position. When it is desired to vary the angle of the block 16, and tracks 30 relative to the base, the nuts 35, may be loosened and the lower ends of the arms 28 moved in either direction, as desired and said nuts again tightened.

The forward ends of the tracks 30, 30, are curved upwardly forming the arcuate hangers 36, 36, which are spaced apart and when in use these hangers rest against the saw space blocks 37, of the gin, and support the front end of the device. Upstanding from the rear end of each track 30, is a brace 38, the free ends of said braces overlapping and being secured together by the bolt 39, so as to secure said tracks in a fixed relation relative to each other.

The lower ends of the standards 26, 26, are bent rearwardly and extended, forming the bars 39', 39', which are secured between the base 1, and the respective ends of the cross clamp 40, said clamp having a central orifice through which the outwardly threaded stud 41, depending from the base, extends, and the clamp is secured in position thereon, by means of the thumb-nut 42. When it is desired to remove the tracks 30, and their appendants, the bolts 39, and the thumb-nut 42, may be removed and said tracks and appendants then disengaged from the base.

The base 1, has a centrally located, upstanding web 43, to the respective sides of which the platforms 44 and 45, are pivoted at their forward ends, and the inner edge of each platform has a depending flange, said flanges being indicated by the numerals 46, and 47. The rear end of each flange has an arcuate groove, as 48, cut therein from the lower edge, through which a bolt, as 49, extends. The inner end of this bolt is threaded into the web 43, and its head engages against the flange 46. When this bolt is loosened the rear end of the platform may be adjusted, up or down, to the desired position, and the bolt again tightened and the platform fixed in position, thus providing for the adjustment of the files vertically as hereafter described. Mounted upon each platform is a plate, as 50; pivoted at its front end and upon each plate is a track, as 50', triangular in cross section, each extending lengthwise relative to the platform. Near the forward end of this track, is a stud 51, integral therewith and depending therefrom into a corresponding recess 52 in the plate 50, and the rear end of each track 50', has an outwardly extending ear, 53, having an arcuate slot 54, through which the screw 55, extends, the lower end of said screw being threaded into the plate, underneath and the outer end thereof having an enlarged head which prevents the disengagement of the ear from the screw. When it is desired to vary the angle of the track relative to the plate, the screw 55, may be loosened and the track adjusted and said screw again tightened to then hold the track in a fixed position, and the adjustment of the files laterally is thus provided for. Upstanding from the front and rear ends respectively, of each plate, are the bearing members 56 and 57, whose upper ends carry alined bearings 58 and 59, in which the rods 60, 60, reciprocate. The forward ends of these rods carry the respective file braces 61, 61, whose inner ends have suitable bearings which receive the front ends of said shafts, and they are secured thereon by means of the screws 62, 62. These bearings also receive the ends of the files 63, 63, which are held clamped in position thereby. These files project forwardly and are braced and strengthened by the braces 61, 61, which conform in shape thereto.

The crank shaft 7, has the wrists 64, 64, which are in operative connection with the rods 60, 60, through the connecting rods 65, 65, and as the shaft 7 rotates, said rods 60, 60, are reciprocated back and forth in their bearings, through said connecting rods.

The rear end of the web 43, is extended upwardly and the upper end of said extension is formed into a bearing 66, through which the rod 67, slides. The front end of this rod is connected to the block 16 and threaded on to the rear end thereof is the nut 68, which limits the forward movement of said rod and block. Fixed upon the rod 67 in front of the bearing 66, is a nut 70, and interposed between this nut and the bearing 66 and surrounding the rod 67, is the coil spring 71, forming a yieldable seat for the block 16, and holding the gummer 22, yieldingly against the saw.

Fixed to the base 1, on each side and upstanding therefrom at the front end, are the supports 72, 72, whose upper ends have the respective bearings 73, 73, in which the transverse shaft 74, rotates, and fixed to this shaft, and depending therefrom are the short arms 75, 75, which are spaced apart, and the free end of one of which is connected to an alined eccentric 76, carried by the shaft 4, through the eccentric rod 77. The free ends of these arms, are also connected to the corresponding sides of the block 16, through the links 78, 78, pivoted, respectively, to said arms and block.

A bearing member 79, is mounted on the shaft 74, loosely, upstanding from which is the lug 80, having an oblong transverse vertically extending slot 81, therethrough, and pivoted at its front end to this lug, is an eccentric rod 82, whose rear end has connection with the eccentric 83, carried by the shaft 4. An arm, 84, is provided, whose rear end has an oblong transverse slot 85, and a bolt 86, extends through the slots 81, and 85, and secures said last mentioned arm to the lug 80. A collar 81', through which the bolt 86, extends, plays in the slot 81 and the free end of the bolt 86, has the nut 87, screwed thereon. The inner end of said collar rests against the lug 80, and the nut 87, rests against the outer end thereof, and when it is desired to adjust the corresponding end of the arm 84, up or down, relative to the lug 80, and thus increase or decrease the throw of the arm 84, the same can be done by loosening said nut and adjusting the arm and then again tightening the nut, but the bolt 86, has free play in the slot 85, for a purpose to be hereinafter stated.

The arm 84, plays between two of the gin saws, as shown in Fig. 2, and its forward end has laterally projecting lugs 88, which engage with the teeth of the said saws and impart successive partial rotations thereto as will later be explained. If the saws have large teeth, the arm 84, should be adjusted to have a greater throw than would be the case if the saw should have small teeth, which may be done, as above explained.

In operation the device is applied to the saws from the rear so that the saws will be turned backwardly in the process of sharpening. When the wheels 5, are turned, the eccentric rod 82, will first be driven forwardly and the lugs 88, will engage over the teeth of the saws between which the arm 84, plays. Meanwhile the gummer 22, is operating between the teeth opposing it, and lengthen said teeth relative to the saw, and also the files 63, 63, are operating against the angles or corners of the respective teeth opposing them. These files cut off said corners along the entire length of the teeth and reduce the teeth to a hexagonal shape in cross section and to a sharp point at their free ends. While this operation continues, the eccentric rod 82, is moving backwardly, the bolt 86, playing idly in the slot 85, until the rear end of the slot is reached. At this point the eccentric rod 77, is drawn backward by its eccentric 76, which operates through the arms 75, 75, the shaft 74, and the links 78, 78, to withdraw the block 16, carrying the gummer 22, out of contact with the teeth and compressing the spring 71. As the eccentric rod 82, continues to move backwardly, a backward pull is exerted on the arm 84, and thereby a partial turn imparted to the saws and the next successive tooth brought into position to be operated on by the gummer and the files. When the pull of the eccentric 76, is released against the eccentric rod 77, the spring 71, will force the block 16, forwardly and carry the gummer into position between the teeth, the contour of the gummer, as shown in Fig. 7, being such that it will give the proper pitch to the teeth.

It will sometimes be necessary for the files to have an oscillating or swinging motion, which can be provided for by loosening the screws 55, and adjusting the rear ends of the tracks 50' to the desired angle and again tightening said screws to fix said tracks at said angle, and as the files are reciprocated the desired oscillating motion will be imparted to them. This results from the fact that the forward ends of the connecting rods 65, 65, which are pivoted to the rods 60, 60, have depending bearing members 89, 89, whose lower ends are notched to conform to and fit over the respective tracks 50', 50', and which slide along said tracks. When in this position, the rear ends of the tracks 50', 50', will give a certain amount of lateral movement to the lower ends of the bearing members 89, 89, causing them to impart a partial rotation to the rods 60, 60, and the files carried thereby, while they are being rotated. The files are held yieldably against the saw teeth by means of flat springs 90, 90, whose forward ends are secured to the respective platforms 44 and 45, and whose free ends rest against the outer edges of the respective plates 50, 50. The tension of these springs against the plates 50, 50 is regulated by the respective screws 91, 91, which are threaded through the lugs 92, 92, carried by the respective platforms 44 and 45, and whose inner ends rest against said respective springs.

What I claim is:

1. A saw filer and gummer including a file support, a file mounted thereon, means for reciprocating the file, a means partially rotating the file successively in opposite direction during the reciprocation thereof, a disk-like gummer, a supporting means therefor, holding the gummer resiliently against the saw, means for rotating the gummer and a mechanism automatically withdrawing the gummer from contact with the saw.

2. A device of the character described including a reciprocating file, a support vertically and laterally adjustable whereon the file is mounted, means for reciprocating the file, means for adjusting said support to any desired position to vary the position of the file relative to the object being operated upon thereby, means for imparting a partial rotation to the file as it is reciprocating, all in combination with a saw gummer, a drive-shaft operatively connected therewith and driving the same, a mechanism automatically imparting partial rotation successively, to the saw and a mechanism automatically withdrawing the gummer from contact with the saw, while the saw is being rotated.

3. A device of the character described including a reciprocating file, a support vertically and laterally adjustable whereon the file is mounted, means for reciprocating the file, means for adjusting said support to any desired position to vary the position of the file relative to the object being operated upon thereby, means holding said file yieldably against said object, means for imparting a partial rotation to the file as it is reciprocating, all in combination with a saw gummer, a drive-shaft operatively connected therewith and driving the same, a mechanism automatically imparting partial rotation successively, to the saw and a mechanism automatically withdrawing the gummer from contact with the saw, while the saw is being rotated.

4. A device of the character described including a file, a vertically and laterally adjustable support whereon the file is mounted, a means for reciprocating the file, means for adjusting said support to any desired position to vary the position of the file relative to the object being operated upon thereby and a laterally adjustable track mounted on said support, a bearing fixed to the file-reciprocating-means and movable along the track and imparting a partial rotation to the file as it reciprocates, all in combination with a gummer, a drive shaft therefor, a mechanism automatically imparting partial rotations successively to the saw and a mechanism withdrawing the gummer from contact with the saw while the saw is being rotated.

In testimony whereof I have signed my name to this specification in the presence of two subscribing witnesses.

THOMAS W. McMICKEN.

Witnesses:
T. A. RIDDEL,
R. A. FENZL.

Copies of this patent may be obtained for five cents each, by addressing the "Commissioner of Patents, Washington, D. C."